United States Patent [19]

Baker

[11] Patent Number: 4,545,128
[45] Date of Patent: Oct. 8, 1985

[54] APPARATUS FOR CHECKING ALIGNMENT OF TANDEM FLANGELESS MONORAIL WHEELS

[75] Inventor: Dale A. Baker, Waukesha, Wis.
[73] Assignee: Harnischfeger Corporation, Milwaukee, Wis.
[21] Appl. No.: 633,613
[22] Filed: Jul. 23, 1984
[51] Int. Cl.[4] .......................... G01B 3/30; G01B 5/255
[52] U.S. Cl. .................................... 33/203; 33/203.18
[58] Field of Search ................... 33/335, 203, 203.15, 33/203.18, 288, 141 R, 141.5

[56] References Cited

U.S. PATENT DOCUMENTS 4,096,636 6/1978 Little ...................................... 33/203

Primary Examiner—Harry N. Haroian
Attorney, Agent, or Firm—James E. Nilles

[57] ABSTRACT

On a truck comprising tandem flangeless wheels riding on a single rail and four guide rollers rotatable on vertical axes, two at each side of the rail, crabbing and turning misalignments of the wheels are diagnosed from information about which rollers rotate during truck movement in each direction along the rail. For obtaining that information, a small reflective spot is delineated at an eccentric location on the upper surface of each roller, and a photoelectric sensor for each roller, magnetically attached to the truck, has its optical axis aimed at the orbit of the spot to issue an electrical impulse for each roller rotation. A signal device connected to each sensor issues a perceptible signal for each impulse. The signal devices are at a single console to facilitate comparisons of the number of revolutions made by the several rollers during a truck movement.

4 Claims, 8 Drawing Figures

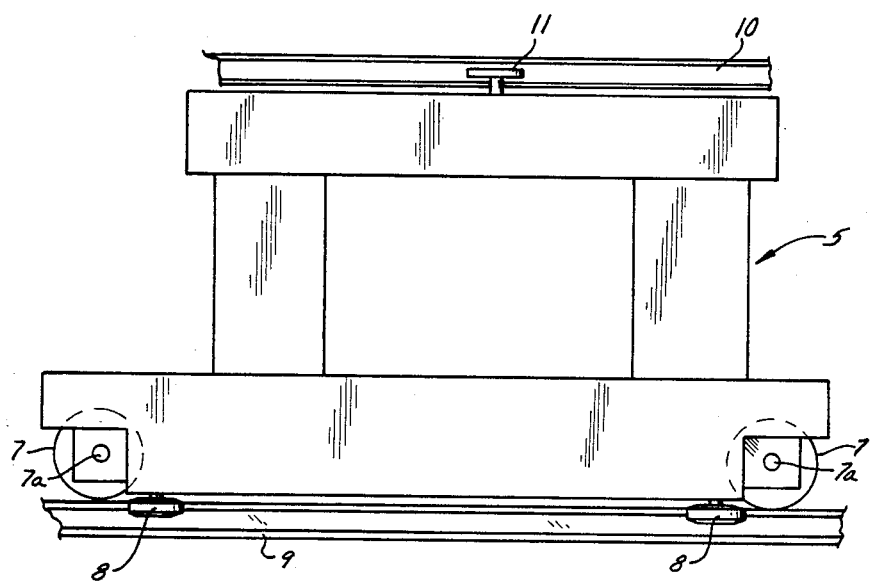
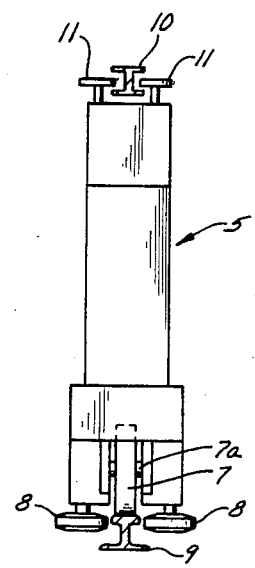
FIG. 1  FIG. 2
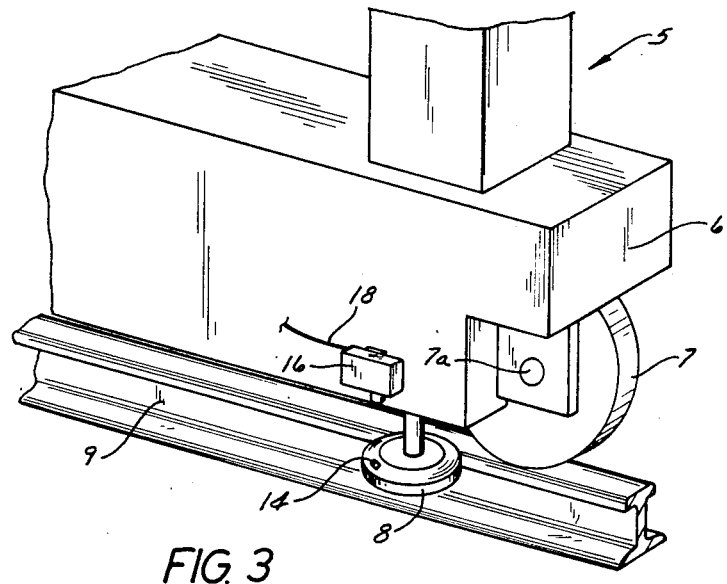
FIG. 3

4,545,128

APPARATUS FOR CHECKING ALIGNMENT OF TANDEM FLANGELESS MONORAIL WHEELS

FIELD OF THE INVENTION

This invention relates to apparatus for detecting misalignment between flangeless tandem wheels that ride along a single rail and are kept on the rail by a pair of guide rollers at each side of the rail, rotating on vertical axes; and the invention is more particularly concerned with test equipment which can be quickly installed on and removed from a truck comprising flangeless wheels and cooperating rollers and which provides information about both the nature and the degree of any misalignment of the flangeless wheels.

BACKGROUND OF THE INVENTION

Rail mounted cranes and certain other types of machines that are mounted for travel through limited distances along define paths have trucks that comprise a tandem pair of flangeless wheels that roll along a single rail. To confine the flangeless wheels against movement off of the rail, each truck also comprises guide rollers rotatable on vertical axes, two at each side of the rail.

Such flangeless wheel trucks have significant advantages over trucks with flanged wheels. A wheel flange affords guidance to a rolling wheel by making sliding engagement with the rail, and it thus produces a substantial amount of friction that increases power requirements and causes wear on the wheel and the rail. A flangeless wheel truck, by contrast, produces only rolling friction and bearing friction, both of which are negligible in comparison to the sliding friction of a flanged wheel. Furthermore, the bearings for the flangeless wheels and for the guide rollers that cooperate with them need only support radial loads, whereas the bearings for a flanged wheel have to support substantial axial thrust loads as well as radial loads; hence, a flangeless wheel system can have less expensive bearings which nevertheless have a longer service life.

To some extent the advantages of a flangeless wheel system are lost if the flangeless wheels are out of alignment, that is, if their axes are not accurately parallel and transverse to the longitudinal centerline of the rail. It will be apparent that if the axis of a flangeless wheel is skewed to a substantial extent, the wheel tends to run off of the rail but is confined against doing so by the guide rollers, so that the wheel rolls along in a constant skid that creates power consuming friction, wears the wheel and the rail, and imposes an axial thrust load upon the wheel bearings as well as imposing an abnormally high radial load on the bearings for at least one of the rollers.

With these considerations in mind, it is obviously desirable to check the alignment of flangeless wheels, not only during the initial assembly of the system but also from time to time thereafter to detect and correct any misalignment that may have developed in service. Heretofore, however, there has been no simple and reliable means for accomplishing such checking.

Ordinarily, the wheels and rollers of a flangeless wheel truck are relatively inaccessible and are therefore somewhat difficult to see. Rotation of the guide rollers can afford important clues to the nature and degree of any misalignment, but the rollers are especially hard to observe when the truck is moving along the rail. Even if one or two rollers are visible, a satisfactory determination of the nature and degree of any wheel misalignment requires a knowledge of what all four rollers are doing during a movement of the truck, and one person cannot observe rollers on both sides of the rail at one and the same time.

SUMMARY OF THE INVENTION

The general object of this invention is to provide simple, inexpensive and very effective apparatus for checking the alignment of flangeless wheels that roll on a single rail, capable of providing information about the nature and the degree of any misalignment of the wheels and capable of being quickly and easily installed on and removed from a truck embodying a flangeless wheel system.

A more specific object of this invention is to provide apparatus that presents, at a convenient location, information which signifies the number of rotations made by each of the rollers of a flangeless wheel truck during a movement of the truck along a rail on which the wheels ride, from which information the nature and degree of misalignment of the flangeless wheels can be readily determined.

BRIEF DESCRIPTION OF DRAWINGS

In the accompanying drawings, which illustrate what is now regarded as a preferred embodiment of the invention:

FIG. 1 is a view in side elevation of a flangeless wheel truck and a rail on which it rides;

FIG. 2 is a view in end elevation of the truck shown in FIG. 1;

FIG. 3 is a fragmentary perspective view of the truck with the detector elements of the apparatus of this invention installed on it;

DETAILED DESCRIPTION OF PREFERRED EMBODIMENT OF THE INVENTION

Figure 4A:
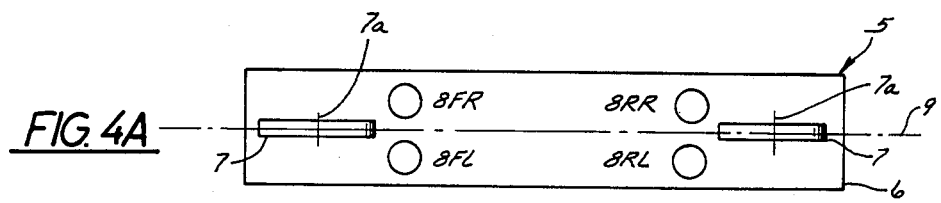
FIGS. 4A–4D are diagrammatic views illustrating four different conditions of alignment of the flangeless wheels of a flangeless wheel truck.

A flangeless wheel truck 5 of the type that presents the problem addressed by the present invention comprises a sturdy frame 6 which carries tandem flangeless wheels 7 that have horizontal axes 7a and four guide rollers 8 that rotate on vertical axes. The flangeless wheels 7 roll along a single rail 9, and the guide rollers 8, two at each side of the rail 9, cooperate with the rail to prevent the wheels 7 from riding off of it. As here illustrated, the truck 5 is confined against tilting from side to side by an upper rail 10, spaced above the rail 9 and extending parallel to it, in cooperation with a pair of stabilizing rollers 11, one at each side of the upper rail, which rotate on vertical axes.

The weight of the truck 5 and any machine (not shown) that it supports is carried by the two flangeless wheels 7, which in turn impose that load upon the rail 9. Usually the wheels 7 are power driven for movement in each direction along the rail 9. The four guide rollers 8, all of which are freely rotatable, are arranged in pairs, the two rollers of each pair being laterally aligned at opposite sides of the rail and the two pairs being spaced apart by a substantial distance along the rail to afford good directional guidance to the truck.

It is to be observed that the guide rollers 8 of each pair are spaced apart by a distance slightly greater than the width of the rail 9, so that if the rail is straight (as is normally the case) no more than two of the four rollers will be in contact with it at any time. This lateral spacing of the rollers 8 minimizes rolling friction between the rollers and the rail and prevents wide spots in the rail from imposing high loads upon the bearings for the rollers; but, more important from the standpoint of the present invention, it makes possible the diagnosis of any misalignment of the flangeless wheels 7.

When the flangeless wheels 7 are in correct alignment—which is the condition illustrated in FIG. 4A—their axes 7a are accurately parallel and accurately transverse to the longitudinal centerline of the rail 9, and they are radially aligned, with one exactly behind the other. Accurately aligned wheels 7 tend to track straight along the rail 9; hence, none of the four guide rollers 8FR, 8FL, 8RR or 8RL will be consistently engaged with the rail while the truck is in motion. It will be apparent that through the course of a number of movements of the truck along the rail in both directions, with the wheels 7 in proper alignment, every roller will have made about the same number of revolutions as each of the others.

Figure 4B:
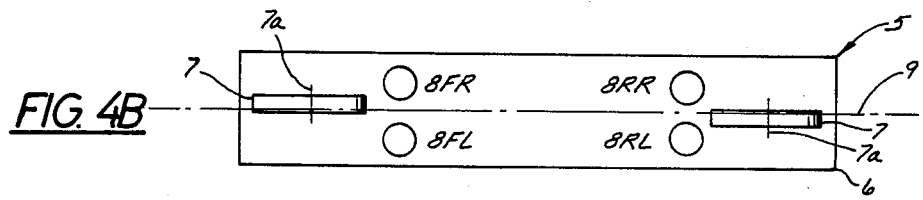

FIG. 4B illustrates a condition in which the wheel axes 7a are properly aligned—that is, they are accurately parallel and transverse to the longitudinal centerline of the rail—but in which the wheels are out of radial alignment, in slight laterally offset relation to one another. Because their axes 7a are properly aligned, the wheels 7 will run straight, and the guide rollers 9 of a truck in the condition illustrated in FIG. 4B will behave in the same manner as those of a truck in the FIG. 4A condition.

Figure 4C:
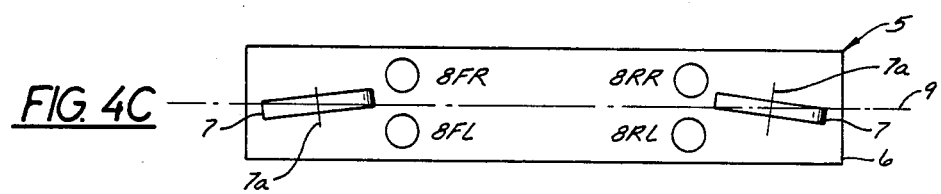

FIG. 4C illustrates a condition of turning misalignment of the flangeless wheels 7, wherein the axis 7a of at least one of those wheels is oblique to the longitudinal centerline of the rail and wherein the wheel axes intersect at one side of the rail so that the truck has a tendency to turn. In the condition illustrated in FIG. 4C, the truck tends to turn to its left as it moves both forward and rearward along the rail. In this case, when the truck is moving forward its front right roller 8FR and its rear left roller 8RL will engage the rail and will rotate; whereas in rearward movement the other pair of diagonally opposite rollers 8RR and 8FL will engage the rail and will rotate.

Figure 4D:
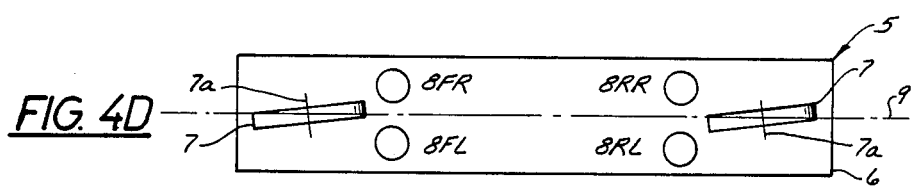
Figure 5:
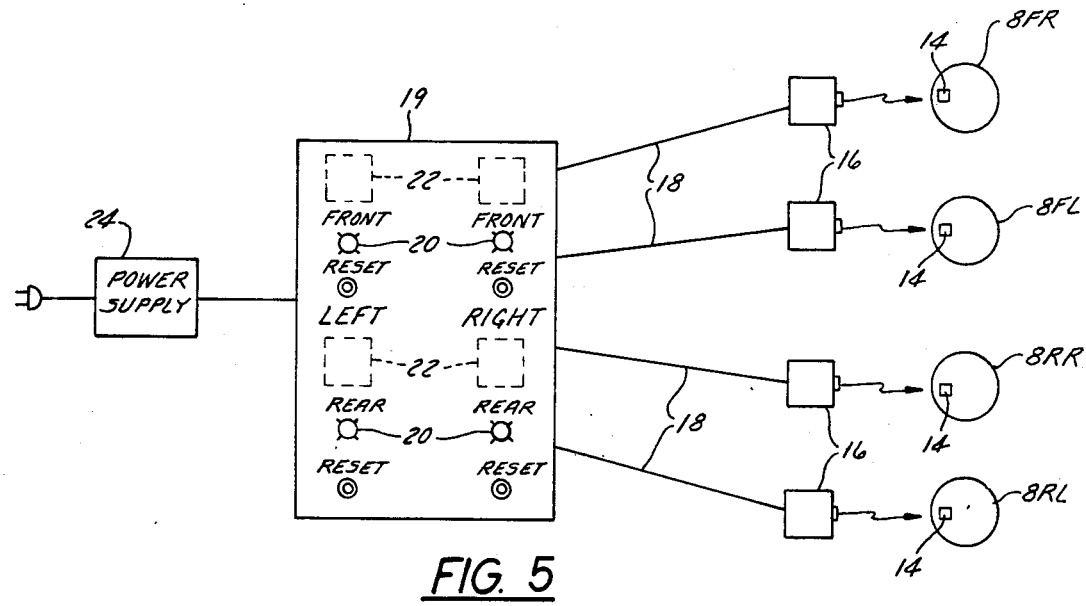
FIG. 5 is a schematic diagram of the apparatus of this invention.

FIG. 4D illustrates a condition of crabbing misalignment of the flangeless wheels 7, wherein the axes 7a of both wheels are oblique to the centerline of the rail, both being skewed in the same direction The front of the truck is again assumed to be at the left side of the drawing. With the illustrated crabbing wheel misalignment, the two rollers 8FR and 8RR at the right side of the rail will engage the rail and rotate during forward movement of the truck, while the two left rollers 8FL and 8RL will engage the rail and rotate during rearward movement.

Thus, the nature and direction of any misalignment can be determined by identifying the particular two rollers that rotate during movement of the truck in each direction.

For each type of misalignment the severity of misalignment can be determined by moving the truck alternately in one direction and the other and observing the distance that the truck moves along the rail from each point of reversal to the point where a pair of rollers begins consistent rotation by reason of firm engagement with the rail.

The apparatus of this invention comprises means for detecting rotation of each of the guide rollers of a flangeless wheel truck and for producing a perceptible signal in response to each revolution of each guide roller, the signal being of such character that the number of revolutions made by each roller during a truck movement can be readily compared with the number of revolutions made by each of the other rollers during the same truck movement. From such a comparison the nature and extent of flangeless wheel misalignment can be diagnosed on the basis of roller behavior as explained above.

For detecting roller rotation, a localized light reflecting area 14 is delineated on the upper surface of each guide roller 8, preferably by means of a small piece of a known type of reflecting adhesive tape. This reflecting spot 14 is of limited extent in the direction circumferentially of the roller and is located at a distance from the axis of the roller 8 to move in an orbit as the roller rotates.

Mounted above each guide roller on the truck frame 6 is a photoelectric sensor 16 which has its optical axis aimed at a point on the orbit of the light reflecting spot 14 on the roller. Desirably the sensor 16 is one that comprises a light source which emits light of a color distinguishable from ambient lighting and which responds to a reflection of that emitted light by emitting an electric current. A typical sensor suitable for the purpose is commercially available from Banner Engineering Corporation, as its SM 502. Each sensor 16 is preferably secured to the truck frame 6 by means of a magnetic clamp.

It will be apparent that with each sensor 16 properly aimed at its roller 8, the sensor will issue an electrical impulse output for each revolution of the roller, as the reflecting spot 14 passes through the optical axis of the sensor. As will also be apparent, two or more circumferentially spaced reflecting spots 14 could be applied to each roller, so that a corresponding number of impulse outputs would be issued by the sensor for each revolution; but it has been found that a single reflecting spot 14 on each roller provides sufficient accuracy for most purposes and has the advantage of simplicity.

For each sensor 16 there is a signaling device, each signaling device being connected with its sensor by means of a suitable cable 18. The four signaling devices are mounted on a common console 19 at which they are readily visible. Each signaling device can comprise a light emitter 20, such as a small light bulb or a light emitting diode, which illuminates in response to each impulse output from its sensor 16. With these light sources 20 appropriately identified, their blinking as the truck moves back and forth along the rail identifies the guide rollers 8 that are rotating and thus enables diagnosis of the condition of alignment of the flangeless wheels.

Since quantitative information about the degree of any misalignment is conveyed by information about the number of revolutions made by each roller in the course of each of a succession of back and forth traverses, each sensor 16 is preferably connected with a resettable counter 22 that records the number of electrical impulse outputs issued by the sensor since a resetting of the counter. The light sources 20 are not essential if counters 22 are incorporated in the apparatus, and counters 22 are not strictly necessary with light emitting signaling devices 20, but inclusion of the two types of signaling device is believed to give the most accurate results and to facilitate reading of the output signals and interpretation of their diagnostic significance.

The sensors 16 and the signaling devices 20 and/or 22 normally require a 12 to 18 v. d.c. power supply, which can be provided for by means of a small converter 24 which is connected with the signal device console 19 or built into it and which can be plugged into a 115 v. a.c. power supply system at a utility outlet (not shown). Thus, for checking the alignment of the flangeless wheels 7 of a crane, spots of reflector tape are applied to the rollers 8, the sensors 16 are magnetically affixed to the truck frame 6, and the console 19 and power supply unit 24 are taken to the crane cab, where the power supply is plugged into the utility outlet receptacle normally present in the cab. The technician then observes the signals at the console 19 as the crane is moved through a few traverses in each direction along the rail. At the conclusion of the wheel realignment operation, the sensors are simply pulled off of the truck and the apparatus can be readily carried to another job site.

From the foregoing description taken with the accompanying drawings it will be apparent that this invention provides simple, inexpensive, compact and efficient apparatus for checking the nature and degree of misalignment of tandem unflanged wheel that ride on a single rail and comprise a part of a truck that also comprises four guide rollers, said apparatus being arranged to provide reliable information about the respective rollers that engage the rail as the truck moves in each direction along it and to present such information in readily perceptible form at a single convenient location.

What is claimed as the invention is:

1. Apparatus for measuring degree of misalignment of tandem unflanged wheels of a truck that also comprises four rollers rotatable on vertical axes, two at each side of a single rail, for constraining the wheels to ride along said rail, said apparatus comprising:
   A. light reflecting means on each roller, spaced from its axis and having limited circumferential extension;
   B. a photoelectric sensor for each roller, each sensor being mounted on said truck in a position to detect passage of the light reflecting means on its roller as the roller rotates and being responsive to detection of each such passage to issue a predetermined number of electrical impulse outputs for each revolution of its roller; and
   C. signalling means for each sensor, connected with the sensor to produce a perceptible output for each impulse output from the sensor, so that the number of revolutions made by each roller during a movement of the truck along the rail can be known and compared with the number of revolutions made by each of the other rollers during the same movement.

2. The apparatus of claim 1 wherein said signalling means comprises an electrically illuminatable element.

3. The apparatus of claim 1 wherein said signalling means comprises a resettable counter.

4. Apparatus for checking the alignment of tandem unflanged wheels of a truck that also comprises four rollers rotatable on vertical axes, two at each side of a single rail, which rollers cooperate with the rail to constrain the wheels to ride along it, said apparatus being characterized by:
   A. means for producing at least one electrical impulse output for each rotation of each roller, said means comprising, for each roller,
      (1) light reflecting means on an upper surface of the roller providing an area on said surface that has a light reflectancy substantially different from that of the remainder of said surface, is of limited circumferential extent, and is spaced from the axis of the roller to move in an orbit with rotation of the roller, and
      (2) sensor means mounted on said truck, above said surface, having an optical axis aligned with said orbit to issue an electrical impulse output at each passage of the light reflecting means through said optical axis as the roller rotates, and
   B. a signaling means for each roller, each said signaling means being connected with the sensor means for its roller and being arranged to produce a perceptible signal for each electrical impulse output, so that the number of revolutions made by the roller during a movement of the truck along the rail can be ascertained and compared with the number of revolutions made by each of the other rollers during the same movement.

* * * * *